United States Patent
Flynt et al.

(10) Patent No.: US 7,933,632 B2
(45) Date of Patent: Apr. 26, 2011

(54) TILE SPACE USER INTERFACE FOR MOBILE DEVICES

(75) Inventors: David Wayne Flynt, Lake Forest Park, WA (US); Bryan T. Agnetta, Seattle, WA (US); Sally Louise Barton, Seattle, WA (US); Eduardo L. Escardo-Raffo, Seattle, WA (US); Tirthankar Sengupta, Sammamish, WA (US); Peter G. Chin, Seattle, WA (US); Hok-Sum Horace Luke, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 936 days.

(21) Appl. No.: 11/424,733

(22) Filed: Jun. 16, 2006

(65) Prior Publication Data

US 2007/0082707 A1 Apr. 12, 2007

Related U.S. Application Data

(60) Provisional application No. 60/718,187, filed on Sep. 16, 2005.

(51) Int. Cl.
*H04M 1/00* (2006.01)
(52) U.S. Cl. ............. 455/569.1; 379/93.17; 379/433.01; 340/995.1
(58) Field of Classification Search .................. 455/564, 455/569.1; 345/156, 173, 358, 428; 379/93.17; 273/292
See application file for complete search history.

(56) References Cited

U.S. PATENT DOCUMENTS

| | | | | |
|---|---|---|---|---|
| 5,349,174 | A * | 9/1994 | Van Berkel et al. | ........ 250/208.1 |
| 5,452,474 | A * | 9/1995 | Kagawa | ...................... 455/569.1 |
| 5,491,495 | A * | 2/1996 | Ward et al. | ..................... 345/173 |
| 5,855,006 | A | 12/1998 | Huemoeller et al. | |
| 5,855,015 | A | 12/1998 | Shoham | |
| 6,044,153 | A * | 3/2000 | Kaschke | .................. 379/433.01 |
| 6,118,426 | A * | 9/2000 | Albert et al. | ................... 345/107 |
| 6,243,074 | B1 * | 6/2001 | Fishkin et al. | ................. 345/156 |
| 6,243,075 | B1 * | 6/2001 | Fishkin et al. | ................. 345/156 |
| 6,252,564 | B1 * | 6/2001 | Albert et al. | .................... 345/1.3 |
| 6,268,857 | B1 * | 7/2001 | Fishkin et al. | ................. 715/863 |
| 6,297,805 | B1 * | 10/2001 | Adler et al. | .................... 345/158 |
| 6,297,838 | B1 * | 10/2001 | Chang et al. | .................. 715/863 |
| 6,340,957 | B1 * | 1/2002 | Adler et al. | .................... 345/1.3 |
| 6,366,302 | B1 | 4/2002 | Crosby et al. | |
| 6,459,418 | B1 * | 10/2002 | Comiskey et al. | ............ 345/107 |
| 6,574,624 | B1 | 6/2003 | Johnson et al. | |

(Continued)

OTHER PUBLICATIONS

OA Dated Dec. 29, 2008 for U.S. Appl. No. 11/424,713, 31 pages.

(Continued)

*Primary Examiner* — William D Cumming
(74) *Attorney, Agent, or Firm* — Woodcock Washburn LLP

(57) ABSTRACT

Systems and methods for providing a user interface for mobile devices enable data and services available through the mobile device to be represented as a set of tiles maintained in a display space. The tiles provide a snapshot of the current state of content available through the mobile device without requiring any interaction by the user. The tiles and display space are customizable and can be dynamically updated to display content to a user. In addition, tiles can provide functionality, including simple tasks to a user without requiring the user to navigate away from the tile display space. Tiles can also provide quick access to start software applications. Tiles can be organized in the display space by the user or the tiles can be automatically grouped based upon associated metadata.

20 Claims, 15 Drawing Sheets

U.S. PATENT DOCUMENTS

| | | | |
|---|---|---|---|
| 6,577,714 B1* | 6/2003 | Darcie et al. | 379/93.17 |
| 6,630,922 B2* | 10/2003 | Fishkin et al. | 345/156 |
| 6,639,578 B1* | 10/2003 | Comiskey et al. | 345/107 |
| 6,724,403 B1* | 4/2004 | Santoro et al. | 715/765 |
| 6,746,065 B1* | 6/2004 | Chan | 296/24.34 |
| 6,795,060 B2* | 9/2004 | Rekimoto et al. | 345/173 |
| 6,801,811 B2* | 10/2004 | Ranganathan et al. | 700/22 |
| 6,825,829 B1* | 11/2004 | Albert et al. | 345/107 |
| 6,872,200 B2* | 3/2005 | Mann et al. | 604/890.1 |
| 6,873,329 B2* | 3/2005 | Cohen et al. | 345/501 |
| 7,027,040 B2* | 4/2006 | Rekimoto et al. | 345/173 |
| 7,028,264 B2* | 4/2006 | Santoro et al. | 715/765 |
| 7,047,276 B2* | 5/2006 | Liu et al. | 709/201 |
| 7,053,893 B1* | 5/2006 | Molnar et al. | 345/426 |
| 7,053,904 B1* | 5/2006 | Kirk et al. | 345/531 |
| 7,082,409 B1 | 7/2006 | Cherry | |
| 7,082,578 B1* | 7/2006 | Fishkin et al. | 715/863 |
| 7,091,927 B1* | 8/2006 | Hagge et al. | 345/1.3 |
| 7,109,878 B2* | 9/2006 | Mann et al. | 340/654 |
| 7,134,081 B2 | 11/2006 | Fuller et al. | |
| 7,139,003 B1* | 11/2006 | Kirk et al. | 345/531 |
| 7,158,682 B2* | 1/2007 | Sano | 382/236 |
| 7,158,878 B2* | 1/2007 | Rasmussen et al. | 701/208 |
| 7,181,438 B1 | 2/2007 | Szabo | |
| 7,195,244 B1* | 3/2007 | Feola | 273/292 |
| 7,240,327 B2* | 7/2007 | Singh et al. | 717/108 |
| 7,283,135 B1* | 10/2007 | Cote et al. | 345/428 |
| 7,308,147 B2* | 12/2007 | Sano | 382/236 |
| 7,315,259 B2* | 1/2008 | Sacks | 340/995.1 |
| 7,325,806 B1* | 2/2008 | Feola | 273/292 |
| 7,376,907 B2* | 5/2008 | Santoro et al. | 715/765 |
| 7,379,811 B2* | 5/2008 | Rasmussen et al. | 701/208 |
| 7,424,541 B2 | 9/2008 | Bourne | |
| 7,435,998 B2* | 10/2008 | Kondo | 257/98 |
| 7,437,566 B2* | 10/2008 | Moore et al. | 713/182 |
| 7,451,987 B1* | 11/2008 | Feola | 273/292 |
| 7,481,434 B1* | 1/2009 | Feola | 273/292 |
| 7,483,905 B2* | 1/2009 | Gauweiler | 707/101 |
| 2001/0015721 A1 | 8/2001 | Byun et al. | |
| 2002/0044149 A1 | 4/2002 | McCarthy et al. | |
| 2002/0065939 A1 | 5/2002 | Liu | |
| 2002/0115476 A1 | 8/2002 | Padawer et al. | |
| 2002/0133488 A1 | 9/2002 | Bellis et al. | |
| 2002/0138474 A1 | 9/2002 | Lee | |
| 2002/0143755 A1 | 10/2002 | Wynblatt et al. | |
| 2003/0004936 A1 | 1/2003 | Grune et al. | |
| 2003/0035008 A1 | 2/2003 | Fuller et al. | |
| 2003/0100315 A1 | 5/2003 | Rankin | |
| 2003/0158839 A1 | 8/2003 | Faybishenko et al. | |
| 2003/0177111 A1 | 9/2003 | Egendorf et al. | |
| 2003/0208456 A1 | 11/2003 | Greenstein | |
| 2004/0030741 A1 | 2/2004 | Wolton et al. | |
| 2004/0043758 A1 | 3/2004 | Sorvari et al. | |
| 2004/0053605 A1 | 3/2004 | Martyn et al. | |
| 2004/0061716 A1 | 4/2004 | Cheung et al. | |
| 2004/0142720 A1 | 7/2004 | Smethers | |
| 2004/0203656 A1 | 10/2004 | Andrew et al. | |
| 2004/0221243 A1 | 11/2004 | Twerdahl et al. | |
| 2004/0250217 A1 | 12/2004 | Tojo et al. | |
| 2004/0260692 A1 | 12/2004 | Brill et al. | |
| 2005/0050001 A1 | 3/2005 | Lucas et al. | |
| 2005/0149496 A1 | 7/2005 | Mukherjee et al. | |
| 2005/0160076 A1 | 7/2005 | Kanemasa | |
| 2005/0207432 A1 | 9/2005 | Velez-Rivera et al. | |
| 2005/0228780 A1 | 10/2005 | Diab et al. | |
| 2005/0240592 A1 | 10/2005 | Mamou et al. | |
| 2005/0262062 A1 | 11/2005 | Xia | |
| 2006/0039548 A1 | 2/2006 | Houmura et al. | |
| 2006/0058026 A1 | 3/2006 | Ang et al. | |
| 2006/0106861 A1 | 5/2006 | Torgerson et al. | |
| 2006/0123360 A1 | 6/2006 | Anwar et al. | |
| 2006/0160528 A1 | 7/2006 | Wang et al. | |
| 2006/0168539 A1 | 7/2006 | Hawkins et al. | |
| 2006/0242586 A1 | 10/2006 | McGlinchey et al. | |
| 2006/0248045 A1 | 11/2006 | Toledano et al. | |
| 2007/0067272 A1 | 3/2007 | Flynt et al. | |
| 2007/0067726 A1 | 3/2007 | Flynt et al. | |
| 2007/0067738 A1 | 3/2007 | Flynt et al. | |
| 2007/0192712 A1 | 8/2007 | Lee et al. | |
| 2007/0240079 A1 | 10/2007 | Flynt et al. | |

OTHER PUBLICATIONS

OA Dated Dec. 1, 2008 for U.S. Appl. No. 11/424,720, 20 pages.
OA Dated Sep. 17, 2008 for U.S. Appl. No. 11/424,706, 32 pages.
U.S. Appl. No. 11/424,706: Final Rejection, dated Dec. 14, 2009.
U.S. Appl. No. 11/424,706: Final Rejection, dated Sep. 17, 2008.
U.S. Appl. No. 11/424,706: Official Action, dated Mar. 27, 2008.
U.S. Appl. No. 11/424,706: Official Action, dated Mar. 9, 2009.
U.S. Appl. No. 11/424,713: Final Rejection, dated Dec. 29, 2008.
U.S. Appl. No. 11/424,713: Final Rejection, dated Feb. 19, 2010.
U.S. Appl. No. 11/424,713: Official Action, dated May 30, 2008.
U.S. Appl. No. 11/424,713: Official Action, dated Sep. 16, 2009.
U.S. Appl. No. 11/424,720: Official Action, dated Dec. 1, 2008.
U.S. Appl. No. 11/424,720: Final Rejection, dated Mar. 19, 2009.
U.S. Appl. No. 11/424,720: Official Action, dated Aug. 21, 2009.
U.S. Appl. No. 11/424,720: Notice of Allowance, dated Mar. 5, 2010.
U.S. Appl. No. 11/765,684: Final Rejection, dated Oct. 27, 2009.
U.S. Appl. No. 11/765,684: Official Action, dated Feb. 22, 2010.
U.S. Appl. No. 11/765,684: Official Action, dated Feb. 25, 2009.

* cited by examiner

TILE SPACE USER INTERFACE FOR MOBILE DEVICES

CROSS-REFERENCE TO RELATED APPLICATIONS

This is an application claiming benefit under 35 U.S.C. 119(e) of U.S. Provisional Patent application Ser. No. 60/718, 187 entitled "ENHANCED PORTABLE DEVICE NAVIGATION TOOLS" and filed Sep. 16, 2005. This application is also related to co-pending U.S. patent application Ser. No. 11/424,720, entitled, "SEARCH INTERFACE FOR MOBILE DEVICES", and filed Jun. 16, 2006; U.S. patent application Ser. No. 11/424,713, entitled, "EXTENSIBLE, FILTERED LISTS FOR MOBILE DEVICE USER INTERFACE", and filed Jun. 16, 2006; and U.S. patent application Ser. No. 11/424,706, entitled, "CONTENT SHARING USER INTERFACE FOR MOBILE DEVICES", and filed Jun. 16, 2006. The entireties of the above-noted applications are incorporated by reference herein.

BACKGROUND

Mobile or portable devices have become increasingly popular and prevalent in today's society. Many users utilize a mobile device, such as a cellphone, as their primary means of communication and carry such devices with them constantly. Mobile devices can include multiple functions such as cellular phone service, voice over Internet protocol ("VoIP") phone service, software applications, email access, Internet capabilities, calendar functions, music players and the like. Functions, features and capabilities have increased both the utility and complexity of mobile devices. It is likely that functions will continue to be added to mobile devices further increasing both usefulness and intricacy.

While consumers desire additional functionality, the sheer volume of information and features make it difficult for users to access commonly used data and functions. Mobile device complexity also makes it difficult for users to fully exploit the capabilities of such devices. The problem is exacerbated by the generally limited user interfaces of mobile devices. Such devices are designed to be small, lightweight and easily portable. Consequently, mobile devices typically have limited display screens, keypads, keyboards and/or other input devices. Due to the size of the user input devices and display screens, it may be difficult for users to enter, retrieve and view information using mobile devices.

Users may have difficulty in accessing the information or function they desire due to the organization of the volume and variety of information that may be contained in or accessed by the mobile device, as well as the growing number of functions such devices are capable of supporting. Conventional menu structures for mobile devices require users to remember a hierarchy of functions or applications to reach the desired data or task. Information is frequently organized based upon the application software that provides or manages the information. Consequently, users can be required to access information based upon the various software applications rather than based upon user utility. Users can become frustrated when they are unable to locate the desired information or tasks and may be unable to fully exploit the advantages of the mobile device.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the provided subject matter concerns an improved user interface for mobile devices such as smartphones, personal digital assistants (PDAs) and the like. An enhanced, customizable user interface can be updated dynamically to provide users with content without requiring user interaction. Users can monitor status and/or data of content accessible through the mobile device by simply observing the user interface.

The user interface can include a set of dynamic tiles. The tiles can include graphics, text or any other visual data. A number of tiles can be displayed using thumbnail views that provide minimal data. In addition, a tile can be selected as the active tile and displayed in an enlarged view including additional content. Tiles can be updated to reflect changes to associated content accessible through the mobile device. Content can be local to the mobile device or located remotely. For example, a tile can include data provided by an Internet subscription news service. Tiles can also provide independent functionality, including simple tasks, to users without requiring users to navigate away from the tile display space. In addition, tiles can provide users with quick, direct access to launch software applications available through the mobile device.

Tiles can be positioned within a tile space. A tile space can be any shape or size and can extend beyond the edges of a display screen of a mobile device. Users can utilize a keypad, stylus or the like to pan the display to view additional portions of the tile space. In addition, the active tile can be updated based upon navigation through the tile space, allowing users to see a summary view of additional tiles.

Tiles can be positioned or placed within a tile space to optimize presentation of content to users. Users can specifically position tiles within the tile space. In addition, the user interface can perform certain basic organization tasks to position tiles within a tile space. For example, the user interface can reorganize tiles to remove gaps between tiles. The user interface can also group or cluster tiles based upon metadata associated with the tiles. For instance, the user interface can group tiles associated with work-related projects in the lower, left portion of the tile space while grouping tiles associated with a user's personal life in the upper, right portion of the tile space.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
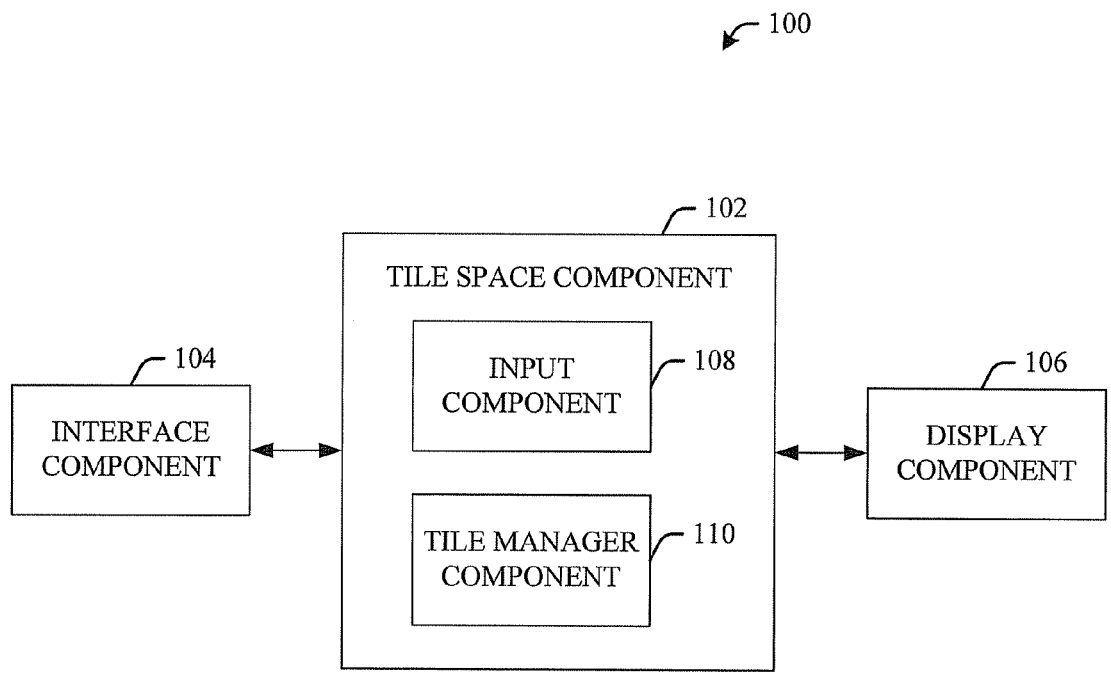
FIG. 1 is a block diagram of a system for providing a tile space display in accordance with an aspect of the subject matter disclosed herein.

The various aspects of the subject matter described herein are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The word "exemplary" is used herein to mean serving as an example, instance, or illustration. The subject matter disclosed herein is not limited by such examples. In addition, any aspect or design described herein as "exemplary" is not necessarily to be construed as preferred or advantageous over other aspects or designs.

Content on mobile devices can take many forms including, but not limited to, contact information, calendar items, mail, music, photos, documents, and tasks or actions. Access to content including data and available tasks is typically provided only through software applications specific to the data type of the content, such as an application used to create or render the specific content data type. For example, to read email from a contact, a user may be required to navigate to and open an email application. To telephone that same contact with a question regarding that email, the user may be required to navigate to the space where that contact's communication details are visible (e.g., a contact card specifying contact specific information). Finding relevant information can require first determining the appropriate software application, opening the application and searching for the relevant information within the application. To view mail from a specific sender, the user may be required to navigate to an email application and search by the sender's name.

An enhanced user interface can include a tile space that can function as a home screen for a user, providing relevant content and quick access to applications. The tile space can provide users with a view or dashboard to monitor the current state of a subset of content obtainable through the mobile device. Many of the most frequently used functions or data can be accessed without navigating away from the tile space. The tile space can be capable of managing any number of tiles. One or more sets of tiles can be customized to provide for a particular user.

Individual tiles can provide users with access to applications, application content, remote content and/or independent functionality. One or more tiles can provide a user with the data and tasks most likely to be relevant to the particular user without requiring the user to leave the tile space. Typically, tiles are represented in a small or thumbnail view that provides some minimal amount of information. One tile, referred to herein as the active tile, can be shown in an expanded or summary view. An expanded view of the active tile allows additional information or functions to be provided to a user without necessitating navigation from the tile space to an application space. Users can select an active tile from the set of tiles managed by a tile space.

Figure 2:
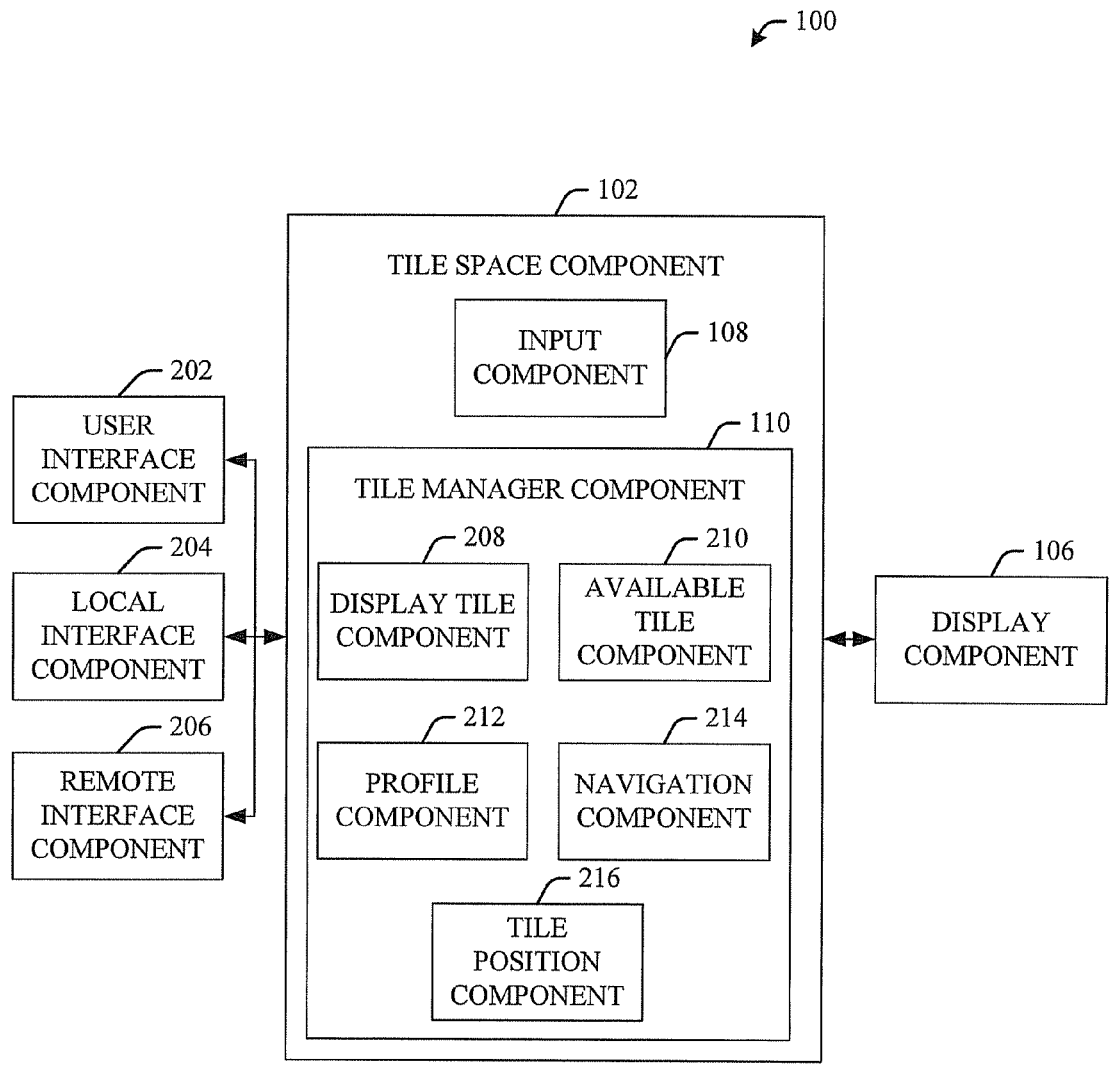
FIG. 2 is a block diagram of a system for providing a tile space display in accordance with an aspect of the subject matter disclosed herein.

Referring now to FIG. 1, a display system 100 for a mobile device in accordance with an aspect of the subject matter disclosed herein is illustrated. The system 100 can include a tile space component 102 that receives input from one or more interface components 104 and changes the view of a tile space on a mobile device (not shown) via a display component 106 according to such input. The system 100 can operate on any type of mobile device, including, but not limited to, a PDA, text messenger, cellular phone, pocket personal computer, smartphone, ultra-mobile tablet PC and the like. Input from the interface component 104 can include content obtained from one or more software applications. Input can also include user input generated using a touch screen, keypad, joystick, or any other type of control. A single interface component 104 is illustrated herein for simplicity; however, as shown in FIG. 2, multiple interface components can be utilized including separate interface components for user input and input from applications.

The interface component 104 can include or can be connected to a content sharing system capable of facilitating sharing of content from multiple software applications. A content sharing system can provide a standard interface between clients such as the interface component 104 and applications providing content. This interface ensures that clients need not have knowledge of the underlying data structures or even the identity of applications to access content.

A content sharing system can manage the supply of data and simple tasks associated with the data to the interface component 104. Applications can register new categories or classifications of data and associated tasks with the content sharing system, automatically allowing the interface component 104 to access the new data categories and tasks. Applications can also provide the content sharing system with data supplier components capable of retrieving data from the underlying data stores of the applications. In addition, applications can provide task executors capable of executing actions or tasks on data items of selected data types or categories. The central content sharing system can provide data and tasks to clients in response to queries or requests.

The interface component 104 can obtain data and associated tasks by generating a query specifying the category or type of data requested as well as context used to identify relevant data of the requested category. A set of data requests based upon the query from the interface component 104 can be distributed to data supplier components for various software applications. The data supplier components can retrieve the relevant data from the underlying data stores of associated applications and the retrieved results can be assembled and returned to the interface component 104. The query, data requests and query results can be specified in a declarative language, such as extended markup language (XML) to facilitate transfer of data without requiring knowledge of data structures by the client.

In another embodiment, the interface component 104 can interact directly with one or more software applications. Applications can notify the interface component 104 of a change to content and provide updated content directly to the interface component 104. In addition, the interface component can poll or request content from one or more applications either dynamically or periodically.

The tile space component 102 can include an input component 108 that obtains, receives and/or requests input including user input and content from the interface component 104. The input can be used to generate the view of the tile space. In addition, the tile space component 102 can include a tile manager component 110 that manages a set of tiles that can be displayed in a tile space.

Referring now to FIG. 2, the display system 100 can include multiple interface components that provide input to the tile space component 102. The display system 100 can include a user interface component 202 that provides for input from a user. The system can also include a local interface component 204 that provides local content including data and tasks from software applications local to the mobile device. In addition, the system can include a remote interface component 206 that allows for input from remote sources. For instance, a remote interface component 206 can obtain data from an Internet source. One or more of the interface components can be combined into a single interface component.

The tile manager component 110 can include a display tile component 208 and an available tile component 210. An available tile component 210 can manage a set of all tiles currently available for inclusion in the tile space. The set of tiles currently managed in the tile space are referred to herein as the display tiles and are managed by the display tile component 208. The display tiles can be a subset of the set of available tiles offered by the available tile component 210. For example, a large number of possible tiles can be generated either by users, vendors or other entities. Users can select from this large set of available tiles to determine tiles to include within the set of display tiles. Users can customize the set of available tiles and/or display tiles by adding or deleting tiles. The set of available tiles can be identical to the display tiles if all available tiles are included within the tile space.

Users can generate and/or utilize one or more user profiles that specify one or more tiles from the available tiles to be included in the set of display tiles. The profile component 212 can manage one or more user profiles. Different user profiles can be generated to reflect the varying needs or interests of a user. Profiles can be generated based upon location, time of day, day of week, user context or any other user condition that can effect the set of tiles most likely to be relevant to the user. For example, a user can specify a work profile that includes a set of tiles specific to the user's occupation. The user can also create a separate user profile for use outside of work. For instance, users can create weekend profiles including tiles associated with entertainment information, personal contacts and the like. Users can also create profiles specific to geographic locations. Geographic profiles can be particularly useful for users that travel frequently. A user profile can also effect other mobile device or user interface settings and need not be limited to specification of display tiles.

Selection of a user profile can update, reorganize, add or delete display tiles. Users can view a list of possible user profiles and select the most appropriate profile for their current context or state. Alternatively, a user profile can be automatically selected based upon one or more predetermined conditions, such as time of day or day of week. For example, a determination can be made that it is a weekend day and a weekend user profile can be utilized to select or organize a set of display tiles. During weekdays, an alternate set of tiles can be displayed based upon a weekday profile. User profiles can also be selected based at least in part upon geographic location. If the mobile device is capable of determining location, whether using a global positioning system (GPS) or any other manner of determining location, a profile can be selected based upon location of the mobile device. The mobile device can determine if the user is at home, at work or on travel and select the most appropriate user profile. A user can override any user profile selections either by electing a different user profile or by individually adding and/or deleting tiles from the current set of display tiles.

The tile manager component 110 can include a navigation component 214 that controls movement through the tile space. The tile space can extend beyond the limits of the display screen of the mobile device. To view portions of the tile space not currently shown on a display screen a user can indicate a direction to navigate within the tile space via the user interface component 202. The navigation component 214 can determine the tiles in the tile space currently visible and track and update the tiles. Navigation can update the active tile. Typically only one tile is active at any one time; the remainder of the tiles is displayed in a background or thumbnail view. Navigating through the tile space changes the tile that has focus, updating the active tile shown in the summary view.

The navigation component 214 can automatically control navigation through the tile space. For example, the navigation component 214 can automatically navigate to the center of the tile space upon start up. In addition, the navigation component 214 can automatically navigate to display tiles with updated content In addition, the tile manager component 110 can include a tile position component 216 that controls the placement of tiles within the tile space. Tiles can be positioned within the tile space using a variety of methods. Users can specify the position of any or all tiles. In addition, the tile position component 216 can automatically perform certain basic organization operations. For example, the tile position component 216 can prevent a tile from becoming separated from the remainder of the tiles within the tile space by automatically adding or moving tiles adjacent to existing tiles, if any, and removing empty spaces between tiles.

The tile position component 216 can group or cluster related tiles within the tile space. The tile position component 216 can utilize metadata associated with tiles to position like tiles in proximity to each other. Tiles can be grouped based upon user generated classifications and/or metadata. For instance, a user can classify all work-related tiles with one code and classify personal contacts with a second, separate code, thereby creating two distinct clusters of tiles in the tile space. Users can also specify portions of the tile space associated with the classifications. For instance, work-related tiles can be clustered in the upper left portion of the tile space, while personal contacts can be clustered in the bottom right portion of the tile space. Tiles can also be clustered by date of creation, type of data managed by the tile or any other data associated with a tile.

Figure 3:
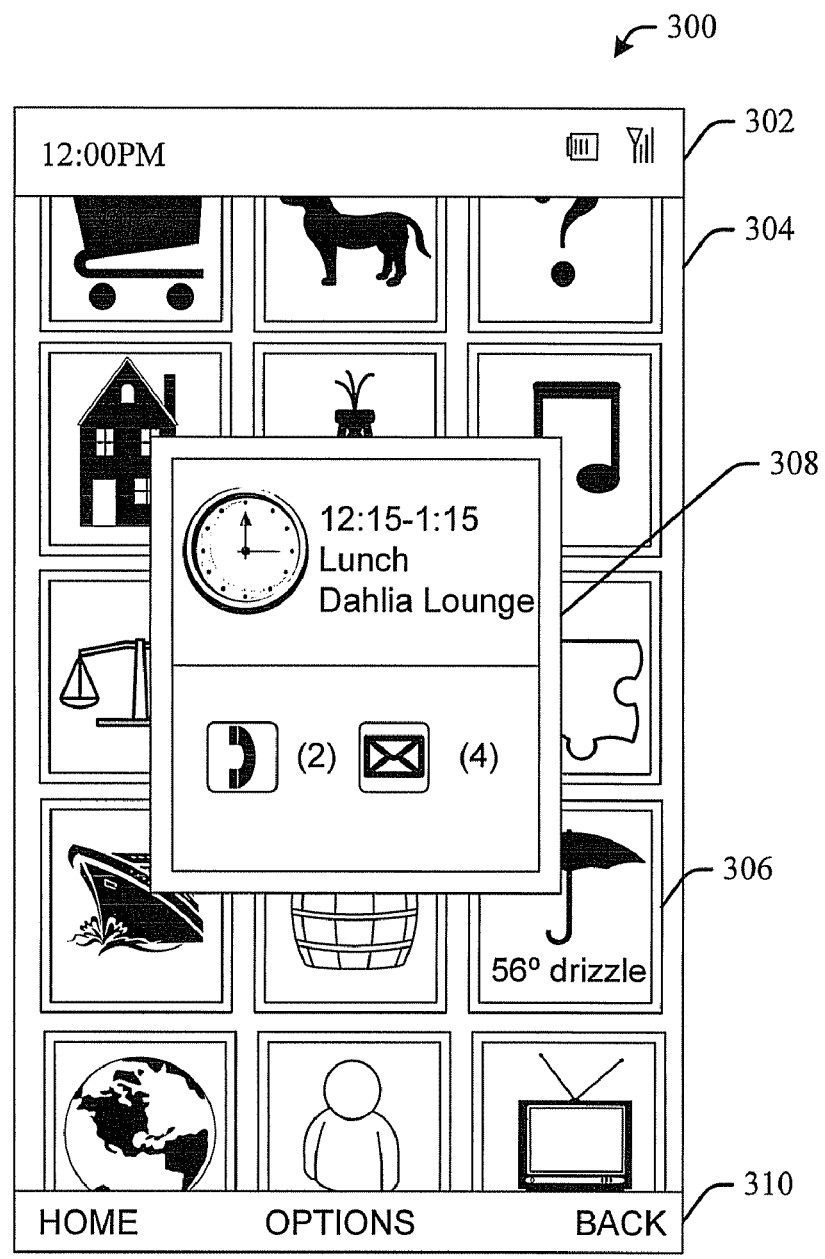
FIG. 3 is an exemplary display depicting a tile space in accordance with an aspect of the subject matter disclosed herein.

Referring now to FIG. 3, an exemplary user interface display 300 including a view of a tile space is illustrated. The user interface display 300 can include a title bar 302 that can include icons, images and/or text indicating the current time, battery power, connectivity or any other status indicators for the mobile device. The user interface display 300 can also include a view of a tile space 304. A view of the tile space 304 can include all or a portion of the tile space displayed on the user interface display 300. The tile space 304 can be represented as a grid of rectangular graphic tiles. Each tile can have two separate visual representations, active and background. The tile space 304 can include one or more tiles 306 in background or thumbnail view. A single background tile 306 is numbered here for simplicity, however as shown in FIG. 3, the tile space 304 can include a plurality of background tiles 306.

The tile space 304 can also include a tile in active or summary view 308. The tile currently in focus is referred to as the active tile 308, shown in summary view. The active tile 308 can include additional information, function and features not available when the tile is shown in background view. For example, a background tile 306 associated with weather information can include the current temperature and conditions in background view. The active or summary view of the same tile can provide additional weather information such as a three day forecast.

In addition, the user interface display 300 can include a softkey bar 310 including one or more softkey functions labels (e.g. Home, Options and More). A softkey is typically a button located proximate to the display space. Generally, the function of the button is defined by the softkey function label shown near the button on the display space. The controls and features illustrated in FIG. 3 are exemplary. Alternative or additional controls and features can be included in a user interface display 300.

The tile space 304, background tiles 306 and active tile 308 can present data and tasks to a user at a central location. In addition, tiles can provide users with information without requiring the user to leave the tile space 304. For instance, even in background view the weather tile 306 can provide a user with weather information at a glance (e.g., current temperature and conditions). Additional information can be obtained by navigating to the weather tile 306. The user is not required to leave the tile space 304 to obtain the additional information. Moreover, tiles are not limited to simply providing content. Tiles can include various functions, features and capabilities, described in further detail below.

Figure 4:
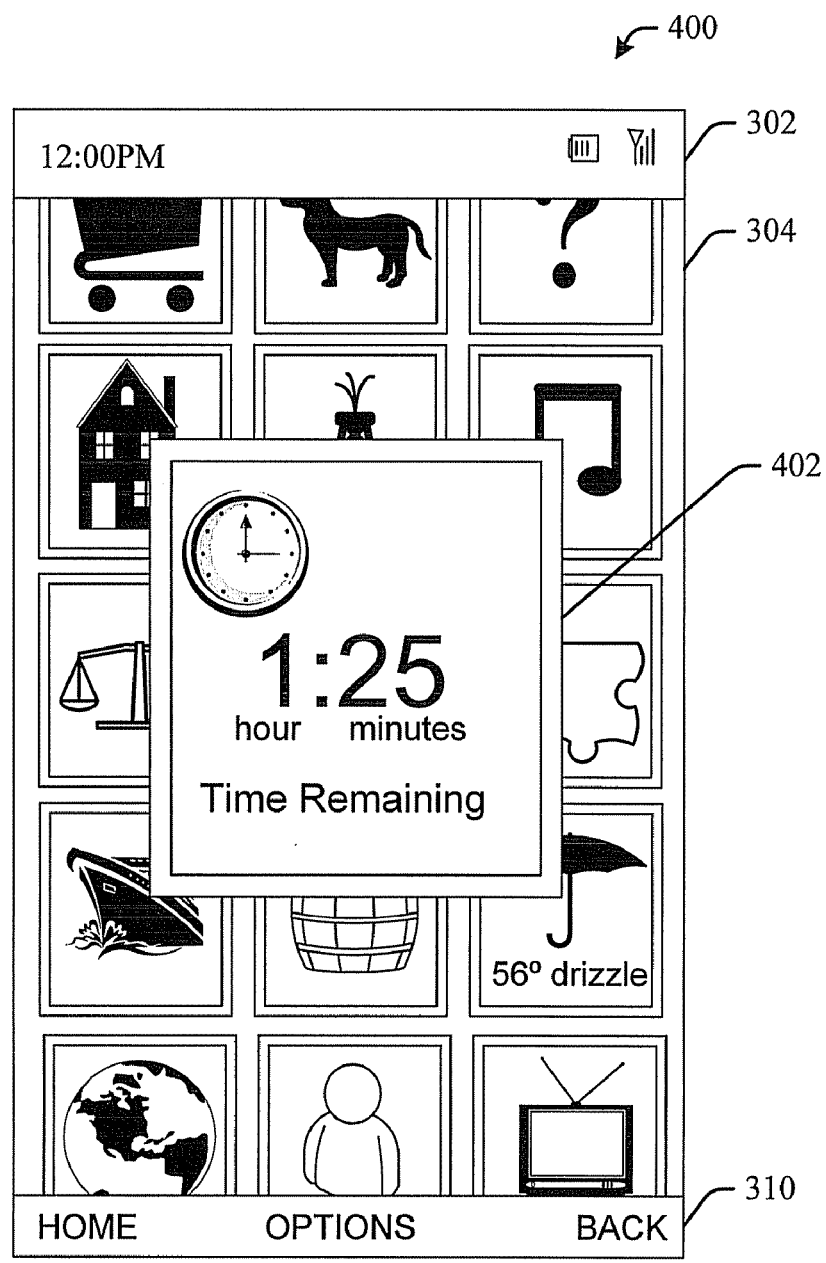
FIG. 4 is an exemplary display depicting an independent tile in accordance with an aspect of the subject matter disclosed herein.

Referring now to FIG. 4, an exemplary display 400 including an independent tile is illustrated. The tile space 304 can support a variety of tile types, including an independent tile 402, shown here in active or summary view. Independent tiles reside only in tile space and have no link to content or other applications either local to the mobile device or remote. Independent tiles offer functionality without requiring navigation away from the tile space. The independent tile 402 of FIG. 4 provides an alarm function. The alarm can be set, cancelled, monitored and responded to without leaving the tile space 304. Users can utilize the alarm tile 402 to track the amount of time left in a parking meter. A background view of the tile can include text indicating the time remaining before the alarm sounds.

Independent tiles can host controls with which the user can interact to preclude requiring the user to navigate away from the tile space to an application. For example, an independent tile can provide a calculator function. A keypad for a mobile device can provide users with the ability to enter numbers. The calculator tile can utilize basic controls such as on screen buttons to implement operators (e.g., +, −, / or *). In another example, an independent tile can provide a simple messaging function.

Figure 5:
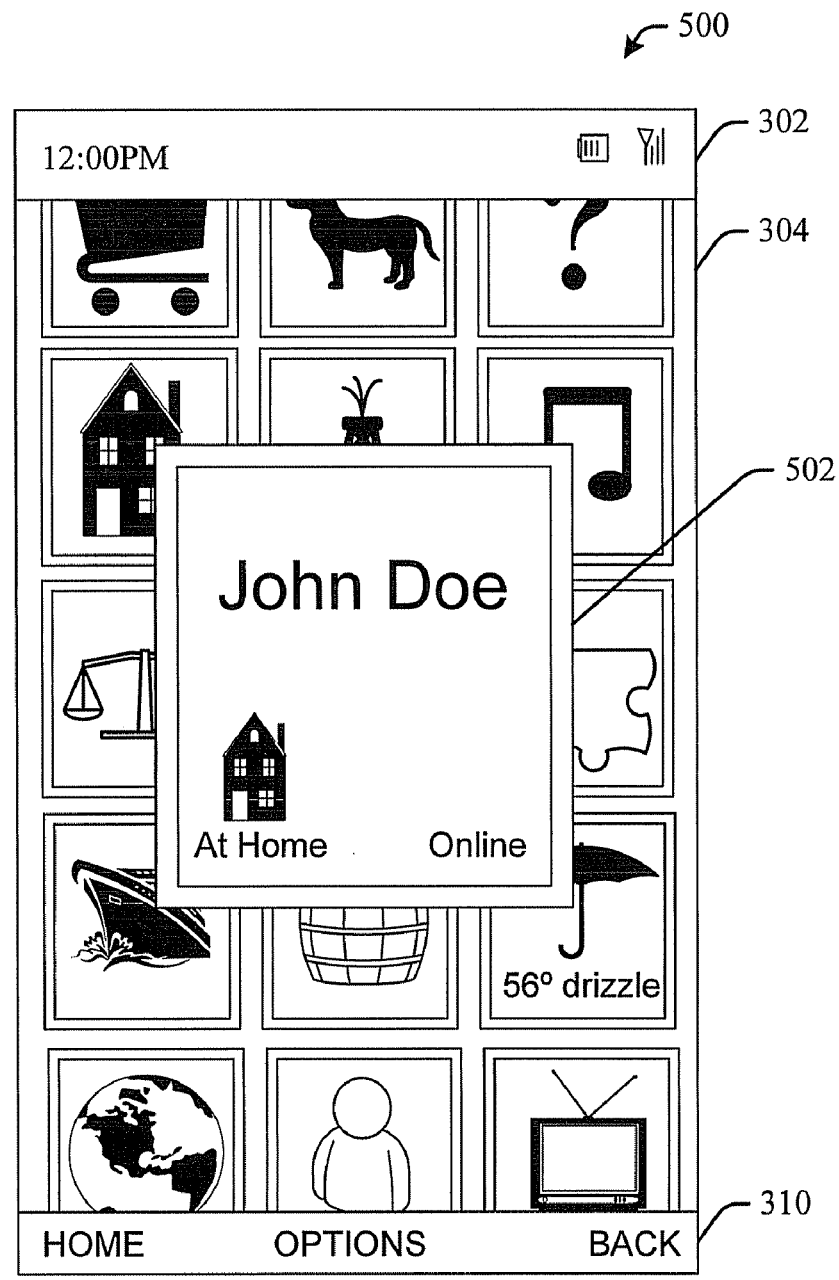
FIG. 5 is an exemplary display depicting a content tile in accordance with an aspect of the subject matter disclosed herein.

Referring now to FIG. 5, an exemplary display 500 including a content tile 502, shown here in summary view, is illustrated. Content tiles can display or represent content provided or maintained by a software application local to the mobile device. For example, the mobile device can include a contact software application that maintains a list of contacts with associated contact cards. Contacts are generally individuals or entities and contact cards generally include information associated with a contact (e.g., name, title, telephone number, email address, physical address and the like). A content tile 502 can act as a shortcut to a contact card included in the contact list maintained by the contact software application on the mobile device. If the content tile 502 is a background tile, the thumbnail view can include an image of the contact, text or any other information regarding the contact. The content tile 502 can include a context indicator for the contact. The context indicator can show the current state of the contact such as whether the contact is online, the contact's location or any other property of the contact. In summary or background view the content tile for the contact can include graphics, text and any other information associated with the contact.

A content tile 502 can also provide the user with the ability to launch the software application associated with the content. Users can view limited content information from a background tile. Users can view additional content information using the summary view. However, the user may wish to perform additional functions, such as updating the contact card. The content tile 502 can provide a user with the ability to launch the full contact application directly from the tile space, without requiring the user to navigate to a menu of available applications.

Figure 6:
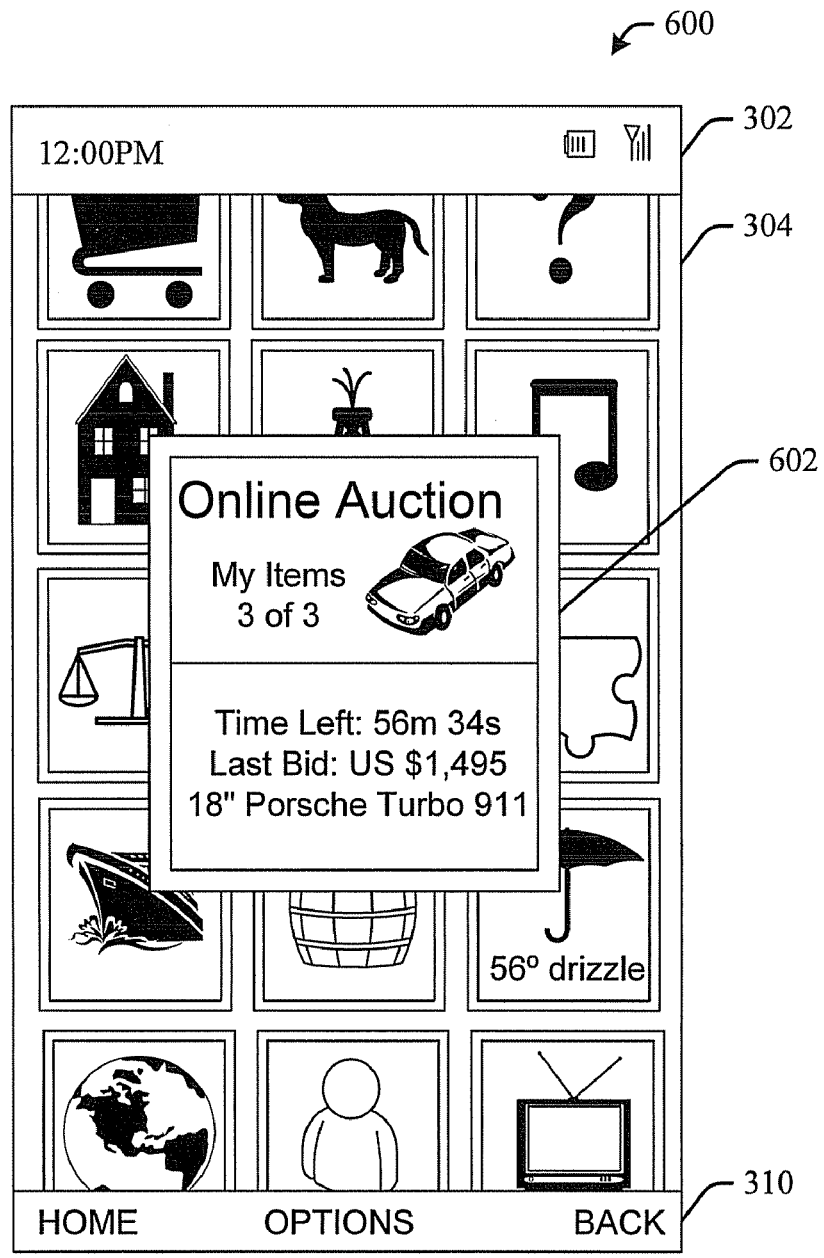
FIG. 6 is an exemplary display depicting a content tile in accordance with an aspect of the subject matter disclosed herein.

Referring now to FIG. 6, an exemplary display 600 including a content tile 602 associated with remote content, shown here in summary view, is illustrated. Content can be retrieved or obtained from a remote source, such as a server. Vendors of services or data can generate and offer tiles to users. For example, a vendor that maintains an online auction website can provide an auction specific tile to a user, such as content tile 602. The auction tile 602 can track the current status of any auctions in which the user is participating, indicating auction information such as the current bid or time remaining in an auction. The content tile 602 associated with the auction can update dynamically to reflect content obtained from the remote source (e.g., additional bids by the user and expiration of item auctions). Tiles can be dynamically updated based upon updated content without direct action by the user.

Content tiles can obtain a variety of content from remote sources. For instance, a user may subscribe to a news service. A tile can display a subset of news provided by the news service and/or as well as an indication of important news bulletins. In a further example, a tile can provide user with access to one or more maps frequently utilized by the user. Typically, geographic data sets such as maps are large. A mobile device may not have the capacity to store multiple maps. Here, a tile can provide quick access to a selected set of maps stored in a remote data store.

Vendors can provide tiles to users as a service. Users can be required to subscribe to the service to obtain content. Alternatively, vendors can provide tiles to users to perform targeted advertising. For example, a clothing retailer can provide a tile that includes data corresponding to online coupons based upon the user's past purchases. In addition, the retailer can provide additional information such as new products tailored to the users buying patterns. In addition, content of the tile can be updated based upon user location. For instance, the provided coupons can be selected based upon proximity of the user to a specific store. Other content accessible from the tile can include information regarding the closest retailer location.

Content tiles can also provide the ability to directly access an associated remote service without having to navigate to a menu of applications. Looking again at the example regarding the online auction, after viewing the summary view, a user can elect to select the tile and access the online auction. An online auction browser can be launched offering the user greater ability to view and interact with desired content, in this case the online auction.

The tile space can also include one or more application tiles. An application tile provides a user with quick, direct access to an application. Activation of an application tile launches the associated application without requiring a user to navigate to a list of applications to search and select the desired application. For instance, an application tile can provide a link to a game or other application. Thumbnail and summary views for application tiles can include graphics, text or other suitable visual cues to allow a user to easily identify the application.

The tile space can also include shortcut tiles. Shortcut tiles can provide shortcuts or links to any other location on the mobile device. For example, the mobile device can include another user interface for navigating mobile device content. Users can utilize a shortcut tile to leave the tile space and navigate to the alternate user interface.

Tiles can include any combination of text, graphic images, hyperlinks or any other visual representation in both summary view and thumbnail view. For example, as shown in FIG. 3, icon, graphic images and/or text can be rendered within the same tile. Further, an image can be used as the background of the tile with text overlaying the image. Each individual tile can include multiple cells or columns that can be populated with data of varying data types. For instance, a messaging tile can include a column or cell for an icon that can reflect the method of communication (e.g., voicemail or text message), a cell for text including the message content and a cell for text including the sender name. Different columns or cells can have separate tasks associated with the individual columns. Accordingly, selection of an icon within a tile can generate different task options than selection of the sender text in the same tile. In addition, tiles can include audio cues or data. For example, audio data may be triggered when a tile is active or selected.

Figure 7:
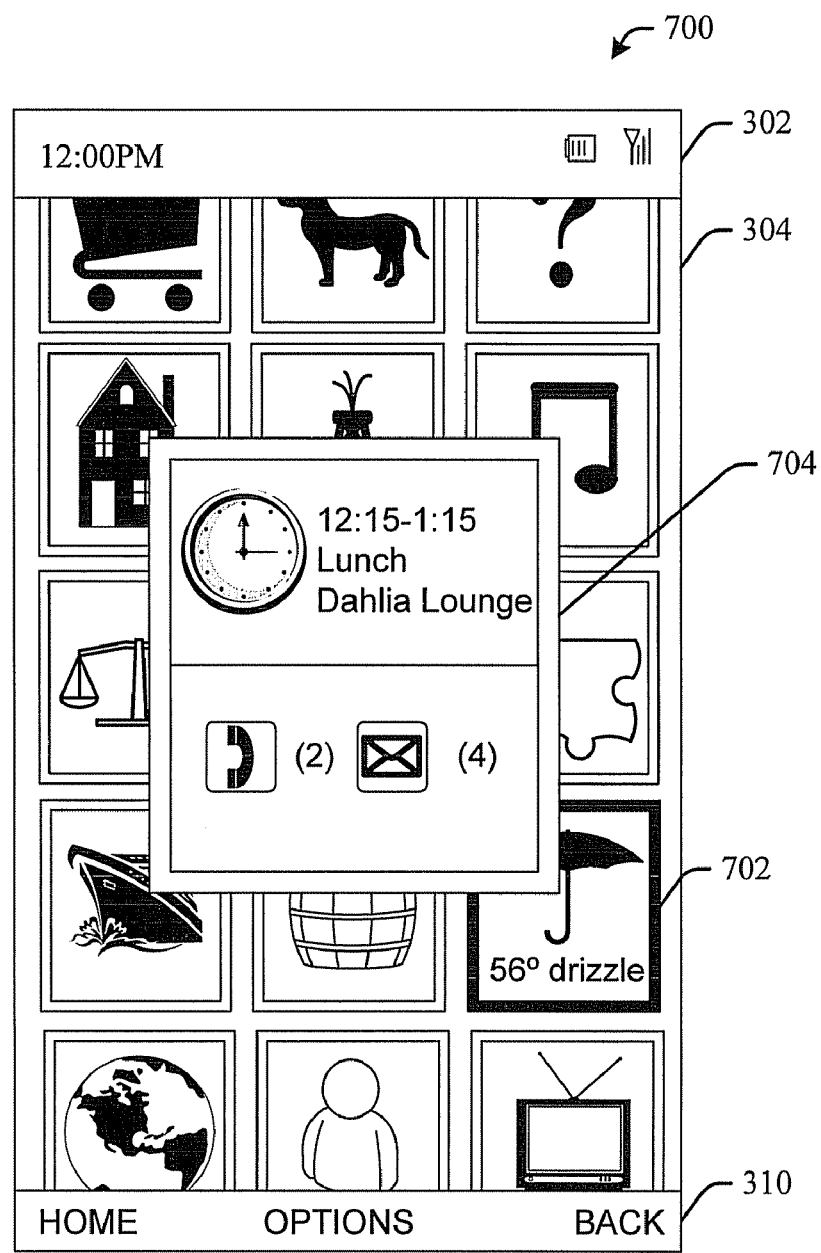
FIG. 7 is an exemplary display depicting an alert in accordance with an aspect of the subject matter disclosed herein.

Referring now to FIG. 7, an exemplary display 700 including a background tile 702 and an active tile 704, including alerts or notifications, is illustrated. A notification or alert, as used herein, is an indicator of a change in state, such as updated or additional content. Notifications can include changes to text, text color, font, background or other visual cues utilized to make users aware of changes associated with a tile. A tile can include an alert or notification in either summary or thumbnail views. For example, the border color of background tile 702 can be modified to indicate change. A user can obtain additional information by navigating to the background tile 702 and observing the summary view of the tile. Active tile 704 can also include one or more alerts or notifications of change to associated content. For example, the active tile 704 includes icons representing telephone messages and email messages. Alerts can be represented as text, shown here as parenthetical numbers adjacent to the icons. The text alerts can indicate newly received voicemail and email messages. Notifications and alerts are not limited to the examples illustrated herein. Alerts and notifications can include any audio, visual or tactile indicia, or any combination thereof.

The tiles described herein are managed in a tile space. The tile space can include any number of tiles. The tile space can be a fixed, predetermined size. Alternatively, users can specify the size of the tile space. In yet another alternative, the size of the tile space can vary depending upon the number and location of tiles positioned within the tile space. The tile space can dynamically grow and shrink as tiles are added and deleted. Although the tile space has been illustrated herein as a grid of rectangular tiles, neither the tile space nor the tiles are limited to a rectangular form. Generally, tiles can be similarly sized to facilitate tile management and usability; however, tiles can vary in size. In addition, tiles have been depicted at evenly spaced intervals; however, the tile space can allow random or uneven distribution of tiles. Any arrangement of tiles that is useful to users can be utilized.

Figure 8:
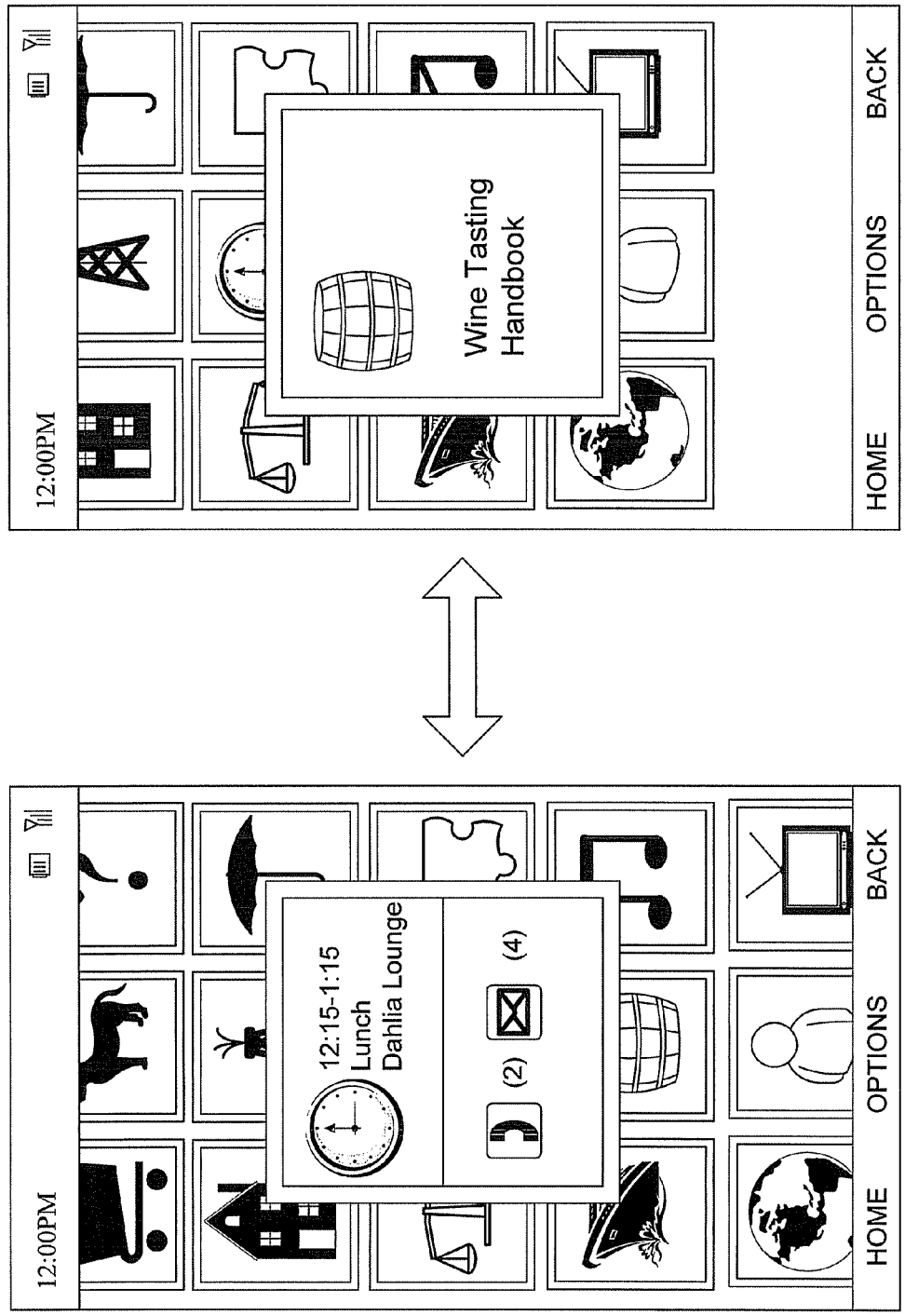
FIG. 8 illustrates navigation of an exemplary display in accordance with an aspect of the subject matter disclosed herein.

Referring now to FIG. 8, navigation within a tile space display is illustrated. As described above, the tile space can be of any size or dimension. Consequently, the tile space can extend beyond the borders of the display screen of the mobile device. As a user provides input through the user interface, the tile space component, in particular the navigation component, can communicate the necessary data to the display component, which can respond by changing the view of the tile space. For instance, suppose that the user indicates movement downward toward the bottom of the display screen. In response, the display component can shift the view downward to reveal tiles that were previously off the screen. In addition, the tile in active view can be updated. Movement within the tile space need not be limited to simple vertical or horizontal panning.

The tile space can facilitate navigation through the tile space providing for wrapping or warping at the edges of the tile space. For example, if a user continues to indicate movement to the right within the tile space, eventually the user will encounter the edge of the tile space. However, the tile space can warp or wrap to the leftmost edge of the tile space. Consequently, the tile space can form a continuous ring or loop. By continuing to indicate movement to the right, a user will eventually return to the initial portion of the tile space. Alternatively, the tile space can wrap or warp in the vertical direction.

Zones or regions can be defined within the tile space to assist in navigation of the tile space. For example, the tile space can be divided into quadrants with a distinct background color can be chosen for each quadrant. This pattern of background colors can allow users to quickly identify their location within the tile space. A predefined set of zones or quadrants can provide users with any easy method for establishing location. However, any background pattern that allows users to orient within the tile space can be utilized.

The appearance of the tile space and tiles can also be customizable. Color schemes, themes and/or skins can be selected by the user to personalize the appearance of the tiles, the tile space or any portion thereof. A user can customize appearance of tile space and tiles based upon aesthetic preferences or to enhance usability. For instance, individual tile spaces, tile space zones or tiles can have separate colors, themes or skins to allow a user to identify a tile, tile space or location within a tile space at a glance.

The user interface can enhance navigation of the tile space by providing users with a method for returning to a home location or tile, such as the center or center tile of the tile space. For example, the user interface can include a button that immediately jumps or warps to the tile space home. Return to the tile space home can be triggered using a button, a stylus or any other method of input for the mobile device.

Figure 9:
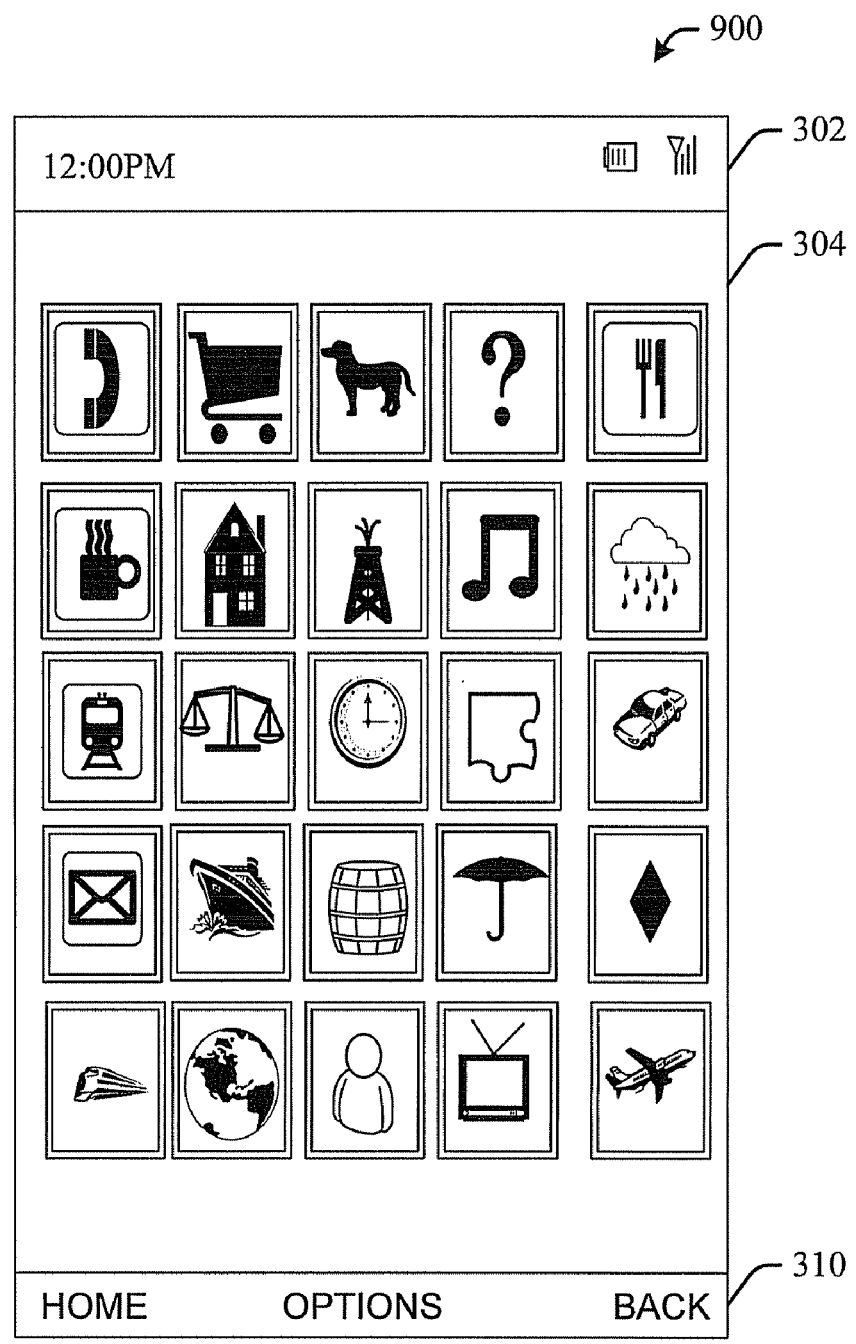
FIG. 9 illustrates a zoomed out display in accordance with an aspect of the subject matter disclosed herein.

Referring now to FIG. 9, an exemplary display 900 depicting a zoomed out display of the tile space is illustrated. The navigation component can provide a zoom function. Zooming out allows a user to determine current location within the tile space. While in the zoom out view, the user can select an alternate portion of the tile space for viewing. After selecting a portion of the tile space, the user can elect to zoom in. At that point the display component will update the display to view the portion of the tile space selected by the user. During zoom out, smaller representations of tiles can be used to allow for the display of additional tiles within the display screen of the mobile device. The zoom out display need not include an active tile. The smaller tile representations can include graphics or any visual indicia. In addition, a display screen indicator (not shown) can be illustrated on the screen. The display screen indicator can be drawn as a box or border showing the portion of the tile space to be displayed upon zoom in. By indicating movement, the user can reposition the display screen indicator within the tile space and thereby update the portion of the tile space to be displayed. Alternatively, the user can select a tile and on zoom in, the selected tile can be displayed as the active tile, centered in the mobile device display screen.

Tiles can be organized within the tile space in any manner that enhances usability for a user. For example, users can manually place or position each tile within the tile space. Tiles associated with a class of information can be grouped together. For example, a user can have several tiles devoted to persons. The user may wish to group all such tiles within the tile space. Consequently, the user can navigate to the portion of the tile space containing the tiles devoted to people to determine the status of all of the contacts at one time. Grouping related tiles can be used in combination with the zones or quadrants described above. For example, the users may elect to position all contact tiles within the upper left quadrant of the tile space. Work-related tiles can be grouped in the bottom right quadrant of the tile space, and so forth. Consequently, background color can indicate not only location within the tile space, but also the type of tile.

Alternatively or additionally, tile position component can automatically organize or place tiles. The tile position component can infer appropriate groups or clusters of tiles based upon the class of information reference by the tiles (e.g., contacts, games and the like), or by any other metadata associated with a tile. Tiles can have a gravity or magnetism based upon any metadata such as tile origin, tile content, user classification of the tile or any other data. Like tiles can gravitate toward each other based upon this gravity or magnetism. Tile magnetism can be used in combination with user classifications or selections to maintain order and organization within the tile space. In particular, as tiles are deleted and added to the tile space, tile clustering using magnetism can facilitate maintaining order within the tile space. Automatic tile management can help prevent cluttering and randomization of the tile space.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Additionally, it should be noted that one or more components may be combined into a single component providing aggregate functionality or divided into several sub-components. The components may also interact with one or more other components not specifically described herein but known by those of skill in the art.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flowcharts of FIGS. 10-13. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

Figure 10:
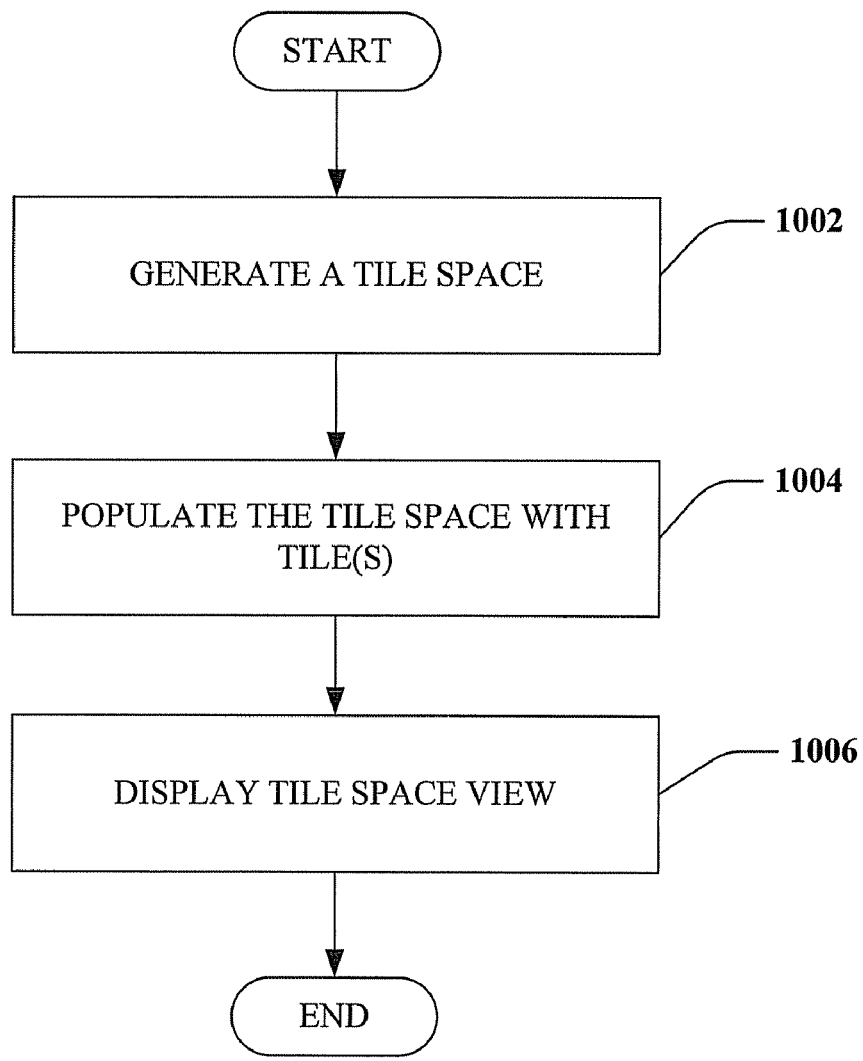
FIG. 10 illustrates a methodology for providing a tile space in accordance with an aspect described herein.

Referring now to FIG. 10, a methodology for updating a tile space in accordance with an aspect described herein is illustrated. At 1002, a tile space is generated for a mobile device. The tile space can be of any size or configuration, such as a rectangular grid or a continuous loop. The tile space can be populated with one or more tiles at 1004. The tiles can be placed within the tile space according to the specifications of a user. Alternatively or additionally, tiles can be placed in the tile space according to tile parameters, such as classes of data associated with the tiles. The tile space can be larger than the available screen of the mobile device. Accordingly, a view of the tile space can include a selected portion of the tile space. The portion of the tile space shown in the mobile device screen can be determined based upon user input. Alternatively, a default portion of the tile space can be shown. A view of the tile space can be displayed on the screen of the mobile device at 1006.

Figure 11:
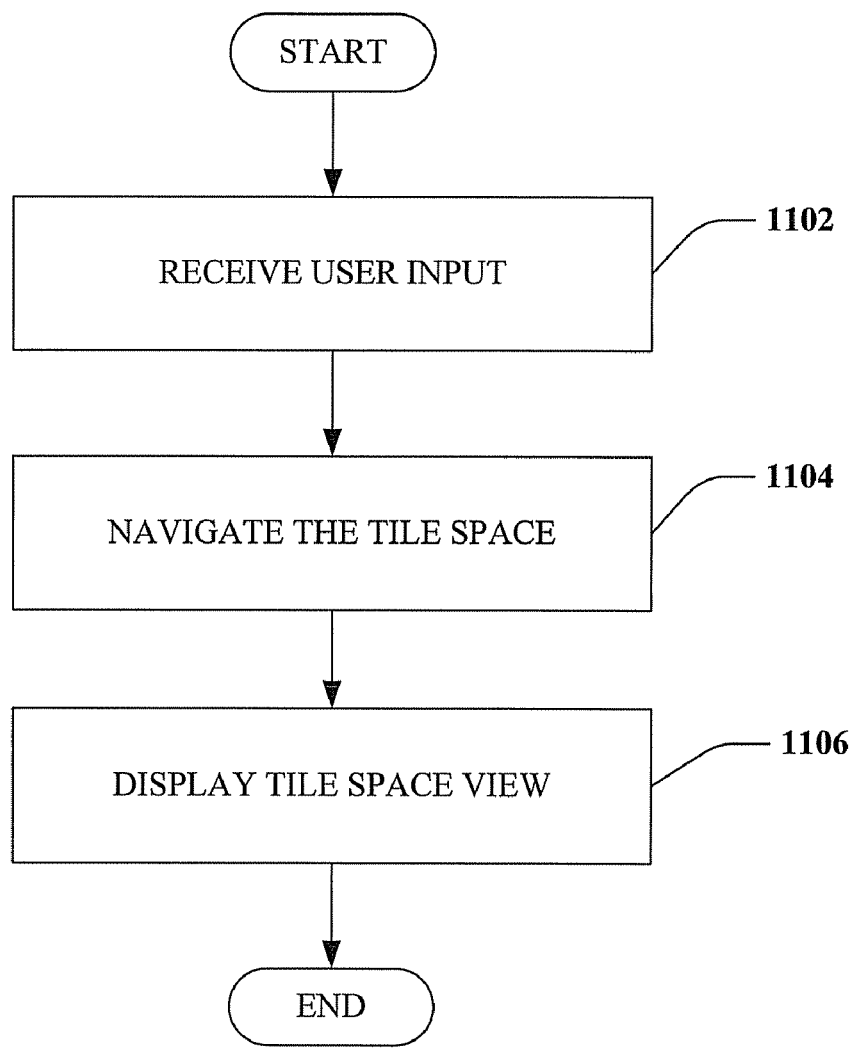
FIG. 11 illustrates a methodology for navigating a tile space in accordance with an aspect described herein.

Referring now to FIG. 11, a methodology for updating a tile space in response to user input in accordance with an aspect described herein is illustrated. At 1102, user input is received. User input can be provided using a keypad, an on-screen button, a joystick and the like. For example, with a multi-directional pad either on-screen or mapped to a keypad or joystick, the user can nudge or move in a desired direction to see other tiles or collections of tiles. The method navigates through the tile space in accordance with user input at 1104. Based upon navigation of the tile space, the active tile and the background tiles visible on screen can be determined. The view dependent at least in part upon the user's input can be displayed at 1106.

Figure 12:
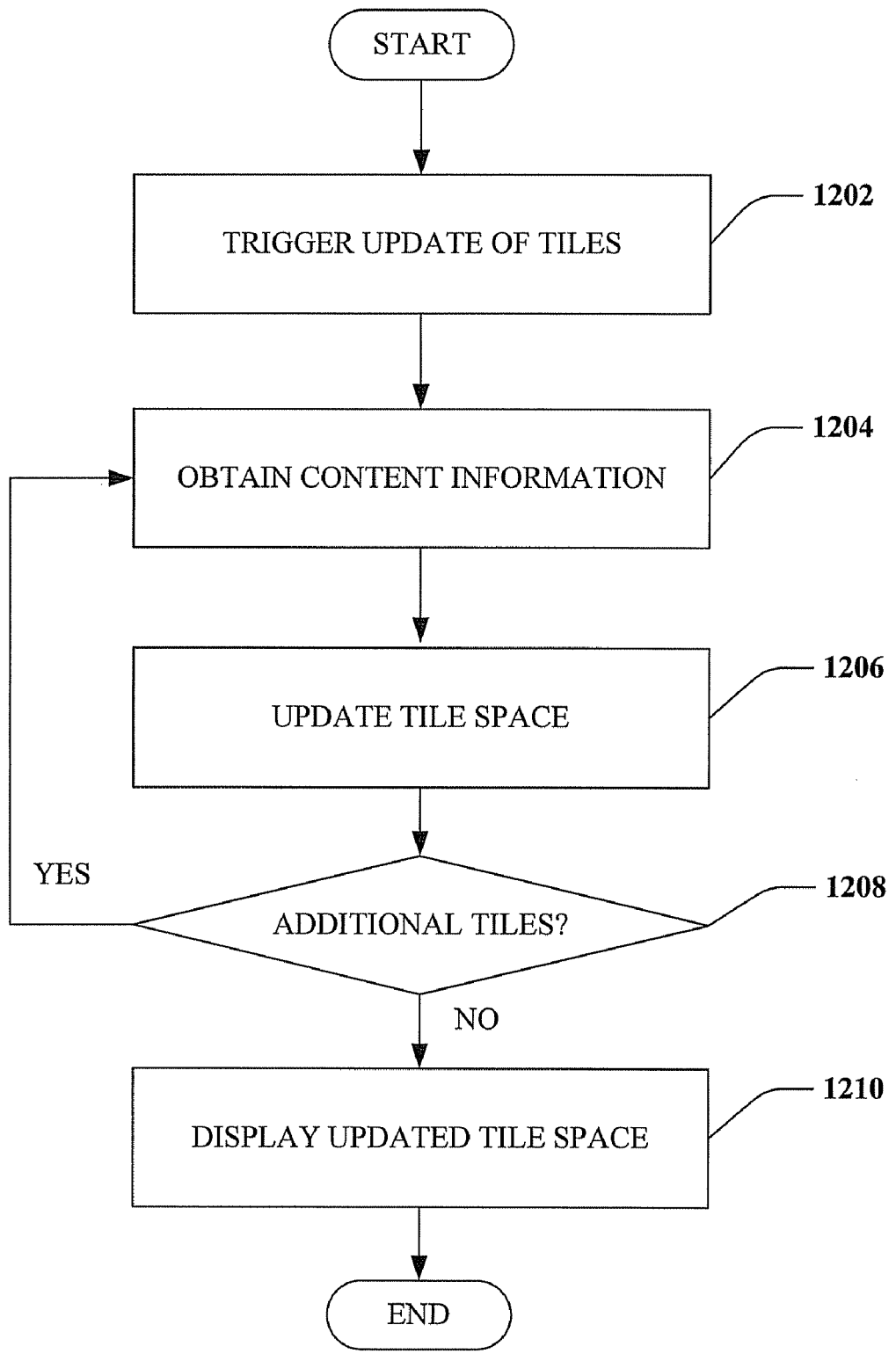
FIG. 12 illustrates a methodology for updating a tile space in accordance with an aspect described herein.

Referring now to FIG. 12, a methodology for updating a tile space in accordance with an aspect described herein is illustrated. At 1202, an update of the tiles, including both the active tile and the background tiles, is triggered. Updates can be triggered by user input such as addition, deletion or modification of tiles. Tiles can also be updated periodically. Tile updates can also be triggered by changes in content associated with the tiles. The content associated with a tile can be obtained at 1204. Content can be obtained upon request. At 1206, the tiles and tile space can be updated based upon the updated content. At 1208, a determination is made as to whether there are additional tiles for which updated content should be retrieved. If yes, the method returns to 1204 and updated information is obtained for the next tile. If no, the display can be updated at 1210 to show the updated tile space.

Figure 13:
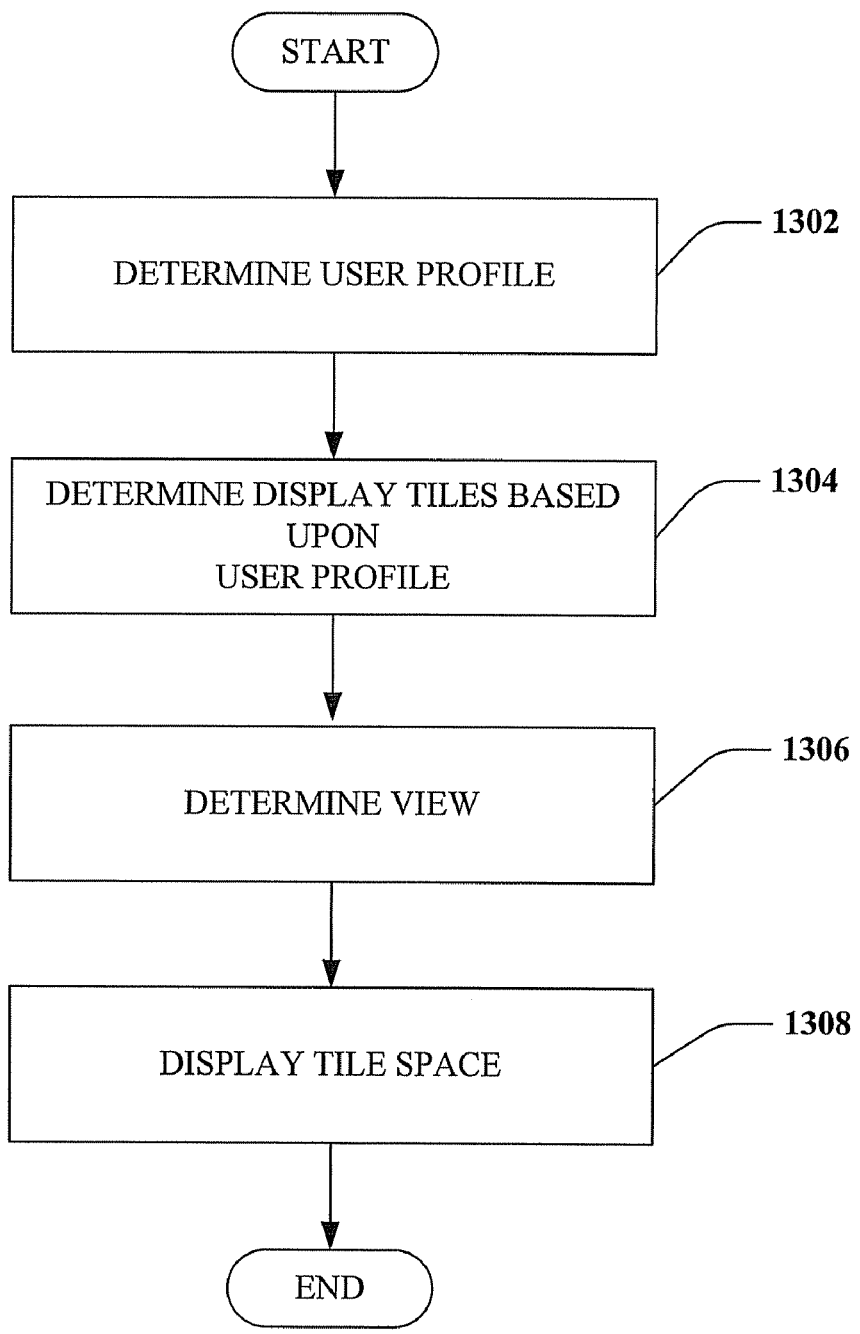
FIG. 13 illustrates a methodology for updating a tile space based upon a user profile in accordance with an aspect described herein.

Referring now to FIG. 13, a methodology for updating a tile space based upon a user profile in accordance with an aspect described herein is illustrated. At 1302, a user profile can be selected from one or more possible user profiles. User profiles can define the tiles available for display on the mobile device and can be specified to provide the user with relevant content based upon the user's context. Selection of a user profile can be based upon location of the mobile device, time of day, day of the week or any other relevant information. At 1304, the tiles to be displayed are selected based upon the user profile. The view of tile space is determined at 1306. For example, the display tiles can include a default tile, such that the display is centered on the default tile. At 1308, the tile space can be updated in accordance with the selected user profile.

Figure 14:
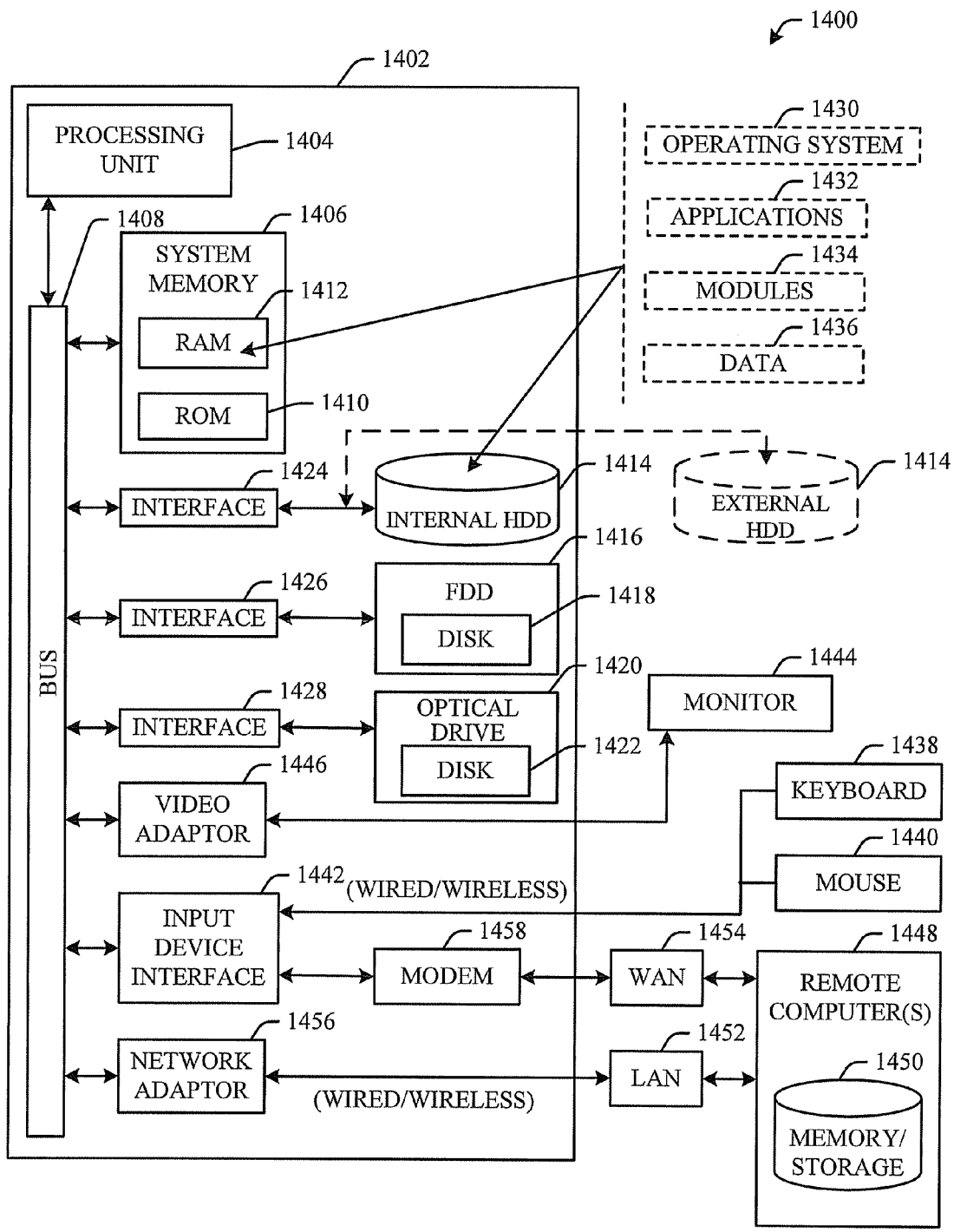
FIG. 14 is a schematic block diagram illustrating a suitable operating environment.
Figure 15:
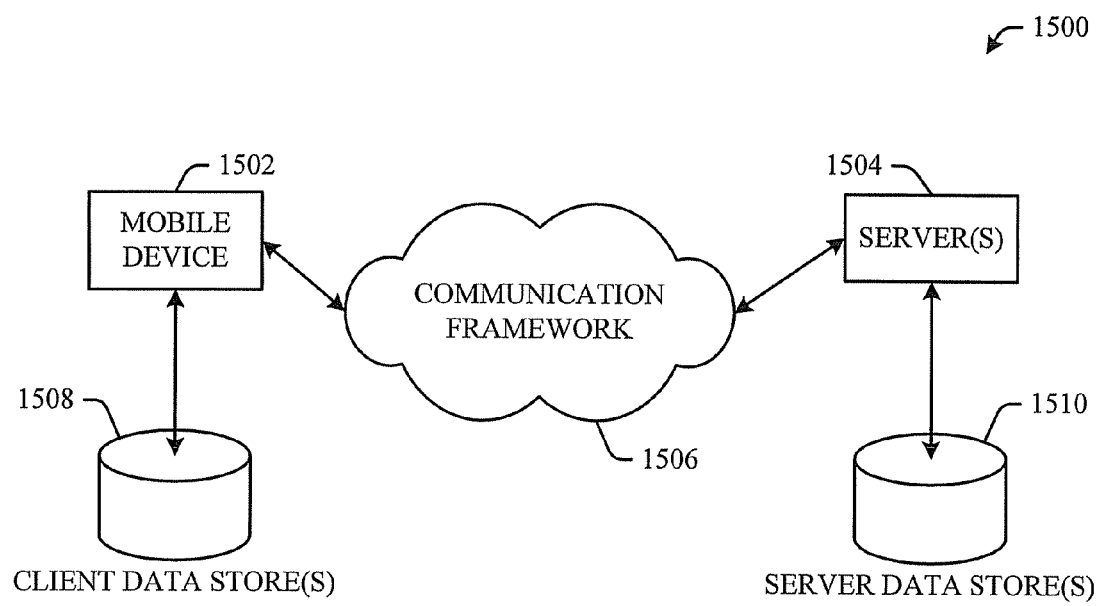
FIG. 15 is a schematic block diagram of a sample-computing environment.

In order to provide a context for the various aspects of the disclosed subject matter, FIGS. 14 and 15 as well as the following discussion are intended to provide a brief, general description of a suitable environment in which the various aspects of the disclosed subject matter may be implemented. While the subject matter has been described above in the general context of computer-executable instructions of a computer program that runs on a mobile device including a computer and/or computers, those skilled in the art will recognize that the innovations described herein also may be implemented in combination with other program modules or software applications. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, handheld computing devices (e.g., PDA, phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the subject matter described herein can be practiced on stand-alone computers, including mobile devices. In a distributed computing environment, program modules may be located in both local and remote memory storage devices.

With reference again to FIG. 14, the exemplary environment 1400 for implementing various aspects of the embodiments includes a mobile device or computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures may also be employed as the processing unit 1404.

The system memory 1406 includes read-only memory (ROM) 1410 and random access memory (RAM) 1412. A basic input/output system (BIOS) is stored in a non-volatile memory 1410 such as ROM, EPROM, EEPROM, which BIOS contains the basic routines that help to transfer information between elements within the computer 1402, such as during start-up. The RAM 1412 can also include a high-speed RAM such as static RAM for caching data.

The computer or mobile device 1402 further includes an internal hard disk drive (HDD) 1414 (e.g., EIDE, SATA), which internal hard disk drive 1414 may also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1494 interface technologies. Other external drive connection technologies are within contemplation of the subject systems and methods.

The drives and their associated computer-readable media provide nonvolatile storage of data, data structures, computer-executable instructions, and so forth. Consequently, the tile instructions can be stored using the drives and their associated computer-readable media. For the computer 1402, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media that are readable by a computer, may be used.

A number of program modules can be stored in the drives and RAM 1412, including an operating system 1430, one or more application programs 1432, other program modules 1434 and program data 1436. The application programs 1432 can provide content for the tiles. All or portions of the operating system, applications, modules, and/or data can also be cached in the RAM 1412. It is appreciated that the systems and methods can be implemented with various commercially available operating systems or combinations of operating systems.

A user can enter commands and information into the computer 1402 through one or more wired/wireless input devices, e.g. a keyboard 1438 and a pointing device, such as a mouse 1440. Other input devices (not shown) may include a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 1494 serial port, a game port, a USB port, an IR interface, etc. A display device 1444 can be used to provide a set of tiles to a user. The display devices can be connected to the system bus 1408 via an interface, such as a video adapter 1446.

The mobile device or computer 1402 may operate in a networked environment using logical connections via wired and/or wireless communications to one or more remote computers, such as a remote computer(s) 1448. For example, the tile instructions can be local to the computer 1402 and software applications can be located remotely on a remote computer 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wired/wireless connectivity to a local area network (LAN) 1452 and/or larger networks, e.g. a wide area network (WAN) 1454. Such LAN and WAN networking environments are commonplace in offices and companies, and facilitate enterprise-wide computer networks, such as intranets, all of which may connect to a global communications network, e.g., the Internet.

When used in a LAN networking environment, the computer 1402 is connected to the local network 1452 through a wired and/or wireless communication network interface or adapter 1456. The adaptor 1456 may facilitate wired or wireless communication to the LAN 1452, which may also include a wireless access point disposed thereon for communicating with the wireless adaptor 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 via the serial port interface 1442. In a networked environment, program modules depicted relative to the computer 1402, or portions thereof, can be stored in the remote memory/storage device 1450. It will be appreciated that the network connections shown are exemplary and other means of establishing a communications link between the computers can be used.

The computer 1402 is operable to communicate with any wireless devices or entities operatively disposed in wireless communication, e.g., a printer, scanner, desktop and/or portable computer, PDA, communications satellite, any piece of equipment or location associated with a wirelessly detectable tag (e.g. a kiosk, news stand, restroom), and telephone. The wireless devices or entities include at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

FIG. 15 is a schematic block diagram of a sample environment 1500 with which the systems and methods described herein can interact. The system 1500 includes one or more mobile device(s) 1502. The mobile device(s) 1502 can be hardware and/or software (e.g. threads, processes, computing devices). The system 1500 also includes one or more server(s) 1504. Thus, system 1500 can correspond to a two-tier client server model or a multi-tier model (e.g., client, middle tier server, data server), amongst other models. The server(s) 1504 can also be hardware and/or software (e.g., threads, processes, computing devices). One possible communication between a mobile device 1502 and a server 1504 may be in the form of a data packet adapted to be transmitted between two or more computer processes. The system 1500 includes a communication framework 1506 that can be employed to facilitate communications between the mobile device(s) 1502 and the server(s) 1504. The mobile device(s) 1502 are operably connected to one or more data store(s) 1508 that can be employed to store information local to the mobile device(s) 1502. Similarly, the server(s) 1504 are operably connected to one or more server data store(s) 1510 that can be employed to store information local to the servers 1504.

The disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g. compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A user interface for a mobile device facilitating surfacing of content available through the mobile device, comprising:
   an interface component that obtains the content;
   a tile space component that manages a plurality of tiles dynamically updated based at least in part on the content and the plurality of tiles positioned within a tile space, wherein the tile space component includes a profile component that manages at least one user profile and the plurality of tiles are selected from a set of available tiles based at least in part on the at least one user profile; and
   a display component that displays a view of the tile space.

2. The user interface of claim 1, wherein the plurality of tiles includes an application tile that provides a link to a software application.

3. The user interface of claim 1, wherein the content is local to the mobile device.

4. The user interface of claim 1, wherein the plurality of tiles includes an independent tile that provides functionality independent of other mobile device applications.

5. The user interface of claim 1, wherein the tile space is divided into a plurality of visually distinct zones.

6. The user interface of claim 1, wherein the tile space component further comprises an available tile component that manages a set of available tiles and a display tile component that manages the plurality of tiles selected from the set of available tiles.

7. The user interface of claim 6, wherein the at least one user profile is based upon one or more of a geographic location, time, and date.

8. The user interface of claim 1, wherein the tile space component further comprises a tile position component that manages the position of each of the plurality of tiles within the tile space.

9. The user interface of claim 8, wherein the positioning of the plurality of tiles in the tile space is based at least in part on metadata associated with each of the plurality of tiles.

10. The user interface of claim 8, wherein the positioning of the plurality of tiles in the tile space is based at least in part on user input.

11. A processor-implemented method, comprising:
    a processor generating a customizable display space capable of managing a plurality of dynamically updating tiles;
    the processor populating the customizable display space with the plurality of tiles, wherein the plurality of tiles are selected from a set of available tiles based at least in part on at least one user profile; and
    displaying a view of the display space on a display screen of a mobile device.

12. The method of claim 11, further comprising receiving user input and the processor navigating through the display space based at least in part on the user input.

13. The method of claim 12, wherein navigating through the display space comprises panning through the display space and selecting an active tile for display in a summary view.

14. The method of claim 13, wherein panning through the display space comprises wrapping from one edge of the display space to an opposite edge of the display space such that the display space forms a continuous loop.

15. The method of claim 12, wherein navigating through the display space further comprises zooming between different zoom depths within the display space.

16. The method of claim 11, wherein displaying a view of the display space further comprises selecting an active tile from the plurality of tiles and displaying an enlarged, summary view of the active tile.

17. A system comprising a processor and a computer-readable storage device, the device storing executable instructions that when processed by said processor cause said processor to implement the steps comprising:
    generating a customizable tile space capable of managing a plurality of tiles;
    populating the customizable tile space with the plurality of tiles;
    selecting one or more tiles from a set of available tiles based at least in part on a user profile;
    dynamically updating the plurality of tiles with the one or more selected tiles based at least in part on content of the selected one or more tiles; and
    displaying a view of the tile space.

18. The system of claim 17, wherein said processor processes said executable instructions to further implement the steps comprising receiving user input navigating through the tile space based at least in part on the user input.

19. The system of claim 17, wherein the user profile is based upon one or more of a geographic location, time, and date.

20. The system of claim 17, wherein said processor processes said executable instructions to further implement the steps comprising panning through the tile space and selecting a tile from the plurality of tiles for an enlarged view.

* * * * *